US011909292B2

(12) United States Patent
Neff et al.

(10) Patent No.: US 11,909,292 B2
(45) Date of Patent: Feb. 20, 2024

(54) MOVING COIL BRUSHLESS MOTOR

(71) Applicant: Systems, Machine, Automation Components Corporation, Carlsbad, CA (US)

(72) Inventors: Edward A. Neff, Carlsbad, CA (US); Koen Bastiaens, Eindhoven (NL); Dave C. J. Krop, Eindhoven (NL); Elena A. Lomonova, Eindhoven (NL); Toan Minh Vu, San Diego, CA (US); Reyhan Zanis, Singapore (SG)

(73) Assignee: Systems, Machines, Automation Components Corporation, Carlsbad, CA (US)

( * ) Notice: Subject to any disclaimer, the term of this patent is extended or adjusted under 35 U.S.C. 154(b) by 218 days.

(21) Appl. No.: 17/497,737

(22) Filed: Oct. 8, 2021

(65) Prior Publication Data

US 2022/0115939 A1    Apr. 14, 2022

Related U.S. Application Data

(60) Provisional application No. 63/090,063, filed on Oct. 9, 2020.

(51) Int. Cl.
*H02K 41/03*   (2006.01)
*H02K 29/08*   (2006.01)
*H02P 6/00*    (2016.01)

(52) U.S. Cl.
CPC .......... *H02K 41/031* (2013.01); *H02K 29/08* (2013.01); *H02P 6/006* (2013.01)

(58) Field of Classification Search
None
See application file for complete search history.

(56) References Cited

U.S. PATENT DOCUMENTS 3,076,530 A * 2/1963 Schaub ............... H02P 29/0022
                                                          188/164
9,375,848 B2 * 6/2016 Neff ..................... B25J 15/0009
(Continued)

FOREIGN PATENT DOCUMENTS

DE   102011051777 A1    1/2013
EP         3076530 A1 * 10/2016 ............... B23Q 5/16
WO   WO-2022076900 A1    4/2022

OTHER PUBLICATIONS

European Patent Office, International Search Report and Written Opinion for PCT/US2021/054289, dated Feb. 3, 2022, 9 pages.
(Continued)

*Primary Examiner* — Naishadh N Desai
(74) *Attorney, Agent, or Firm* — Cooley LLP

(57) ABSTRACT

A moving coil brushless motor including an actuator having a stator and a rotor. The stator includes a cylindrical array of permanent magnets. The rotor includes a coil assembly having a plurality of coils interposed between a stator back plate and the permanent magnet array. The coil assembly rotates relative to the array of permanent magnets. A center shaft is disposed to rotate about a longitudinal axis. A cylindrical transformer is disposed within an interior space circumscribed by the stator back plate and includes a primary side and a secondary side. The primary side includes a primary coil and the secondary side includes a secondary coil magnetically coupled to the primary coil. Primary electronics are in communication with secondary electronics attached to the center shaft. The secondary electronics are configured to receive power from the secondary coil and to provide current to the actuator.

13 Claims, 6 Drawing Sheets

(56) References Cited

U.S. PATENT DOCUMENTS

| | | | | |
|---|---|---|---|---|
| 9,780,634 B2* | 10/2017 | Neff | ............................ | H01F 5/00 |
| 2012/0218069 A1* | 8/2012 | Stancu | ..................... | H01F 38/18 |
| | | | | 336/130 |
| 2018/0071921 A1* | 3/2018 | Neff | ...................... | B25J 15/0009 |

OTHER PUBLICATIONS

International Preliminary Report on Patentability for International Application No. PCT/US2021/054289 dated Apr. 20, 2023, 8 pages.

* cited by examiner

MOVING COIL BRUSHLESS MOTOR

CROSS REFERENCE TO RELATED APPLICATIONS

This application claims priority to and the benefit of U.S. Provisional Patent Application No. 63/090,063, entitled MOVING COIL BRUSHLESS MOTOR, filed on Oct. 9, 2020, the disclosure of which is incorporated herein by reference in its entirety for all purposes.

FIELD

This disclosure relates generally to electromagnetic actuators and, more particularly, to systems including moving coil actuators.

BACKGROUND

Industrial moving coil actuators are favorable for their low inertia, which is beneficial in applications where fast acceleration and deceleration, or high-speeds are required. Generally, power is supplied to the moving coil through a physical connection, for instance a moving cable, which provides an efficient transfer of energy. However, the movement of the actuator is limited due to the cabled connection, which can impose a severe limitation in rotating applications. Furthermore, cable wear might occur as a result of the stress on the moving cable during operation, which ultimately results in failure. A conventional solution to the limitation of the moving cable is the use of a brush commutator, or slip rings depending on the type of commutation. However, the brush commutator and slip rings introduce friction and reliability issues.

SUMMARY

Disclosed herein is a brushless motor comprised of a synchronous moving-coil rotary actuator within which is integrated a wireless power transfer system. The actuator preferably circumscribes a hollow center of the brushless motor, within which the wireless power transfer system is integrated. The actuator includes a stator comprised of inner and outer cylindrical arrays of permanent magnets between which is positioned a cylindrical rotor coil assembly. The permanent magnets of the stator are preferably arranged in a quasi-Halbach configuration in which circumferentially magnetized permanent magnets are added in between radially magnetized permanent magnets. The wireless power transfer system employs a cylindrical transformer in order to transfer, through inductive coupling, power across a small air gap between primary and secondary transformer coils.

In one particular aspect the disclosure relates to a moving coil brushless motor including a rotary actuator having a stator supporting a double-sided permanent magnet array. The double-sided permanent magnet array includes an outer array of permanent magnets arranged in a first cylindrical configuration and an inner array of permanent magnets arranged in a second cylindrical configuration on an inner back plate. The actuator further includes a rotor including a coil assembly formed from a plurality of coils interposed between the outer array of permanent magnets and the inner array of permanent magnets. The coil assembly is disposed to rotate relative to the outer array of permanent magnets and the inner array of permanent magnets. A center shaft is disposed to rotate about a longitudinal axis. A cylindrical transformer is disposed within an interior space circumscribed by the inner back plate, the cylindrical transformer including a primary side and a secondary side. The primary side includes a primary coil and the secondary side includes a secondary coil, the primary coil being magnetically coupled to the secondary coil. Primary electronics and secondary electronics are disposed within the interior space where the primary electronics are in communication with the secondary electronics. The secondary electronics are attached to the center shaft and are configured to receive power from the secondary coil and to provide current to the actuator.

The disclosure also pertains to a moving coil brushless motor including an actuator having a stator and a rotor. The stator includes an outer cylindrical back plate and an inner array of permanent magnets arranged in a cylindrical configuration on an inner back plate. The rotor includes a coil assembly having a plurality of coils interposed between the outer cylindrical back plate and the inner array of permanent magnets. The coil assembly is disposed to rotate relative to the outer cylindrical back plate and the inner array of permanent magnets. A center shaft is disposed to rotate about a longitudinal axis. A cylindrical transformer is disposed within an interior space circumscribed by the inner back plate. The cylindrical transformer includes a primary side and a secondary side. The primary side includes a primary coil and the secondary side includes a secondary coil, the primary coil being magnetically coupled to the secondary coil. The brushless motor further includes primary and secondary electronics disposed within the interior space. The primary electronics are in communication with the secondary electronics, which are attached to the center shaft. The secondary electronics are configured to receive power front the secondary coil and to provide current to the actuator.

In another aspect the disclosure is directed to a moving coil brushless motor including an actuator having an actuator housing, a stator and a rotor. The stator includes an array of permanent magnets arranged in a cylindrical configuration. The rotor includes a coil assembly including a plurality of coils. The coil assembly is disposed to rotate relative to the array of permanent magnets and a center shaft is disposed to rotate about a longitudinal axis. The brushless motor further includes a wireless power transfer system disposed within the actuator housing. The wireless power transfer system includes a cylindrical transformer having primary and secondary transformer coils. The cylindrical transformer is configured to transfer, through inductive coupling, power across an air gap between the primary and secondary transformer coils so as to facilitate delivery of current to the actuator.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

Figure 1:
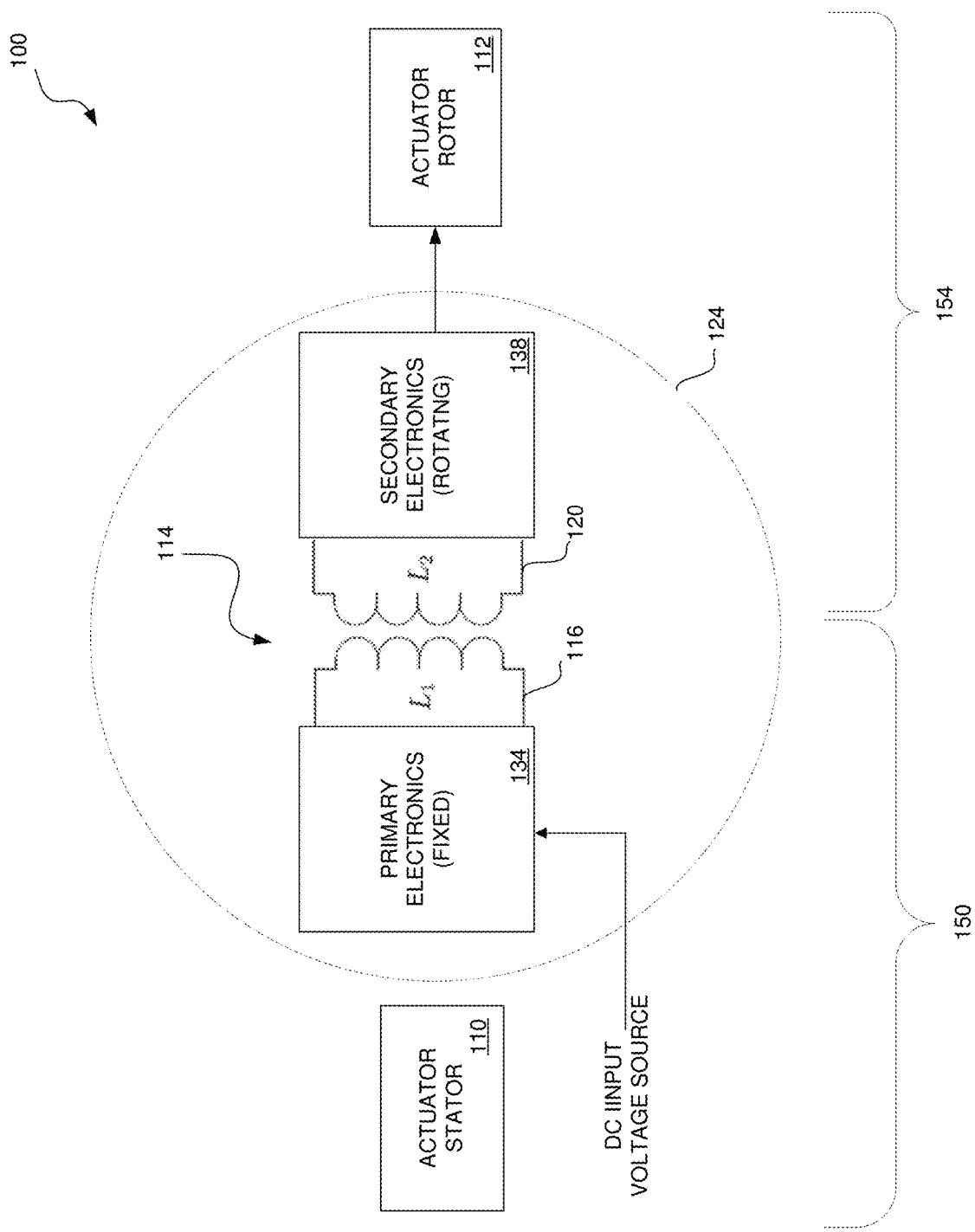
FIG. 1 is a simplified block diagrammatic view of a moving coil brushless motor in accordance with the disclosure.

Attention is now directed to FIG. 1, which is a simplified block diagrammatic view of a moving coil brushless motor 100 in accordance with the disclosure. The motor 100 includes a rotary actuator having a stator 110 consisting of a double-sided permanent magnet array arranged in a cylindrical configuration and a rotor 112 including a coil assembly. A plurality of coils of the coil assembly are disposed to rotate between the outer and inner arrays of the double-sided permanent magnet array of the stator 110. A cylindrical transformer 114 includes a primary coil 116 ($L_1$) magnetically coupled to a secondary coil 120 ($L_2$). The transformer 114 is disposed within an interior space 124 circumscribed by an inner back plate (not shown in FIG. 1) to which the inner array of magnets of the stator 110 may be mounted. Primary electronics 134 and secondary electronics 138 are also disposed within the interior space 124 and are in communication through the transformer 114 or via a separate communication path (e.g., an optical link). The secondary electronics 138 are attached to a center shaft (not shown in FIG. 1) and are configured to receive power from the secondary coil 120 and to provide current to coils of the actuator rotor 112.

The actuator stator 110, primary electronics 134 and primary coil 116 of the transformer 114 form a plurality of non-rotating components 150 of the motor 100. The actuator rotor 112, secondary electronics 138, secondary coil 120 and the center shaft form a plurality of rotating components 154 of the motor 100. As is discussed below, embodiments of the motor 100 advantageously magnetically decouple the actuator 110, 112 from a wireless power transfer system comprised of the transformer 114, primary electronics 134 and secondary electronics 138 by disposing the wireless power transfer system within the hollow interior space 124 of the motor. Such magnetic decoupling may be achieved by, for example, configuring the double-sided (outer/inner) permanent magnet array in the stator 110 in a quasi-Halbach arrangement and by utilizing an aluminum back plate on which to arrange the inner permanent magnet array. In this way the actuator 110, 112 is substantially shielded from high-frequency electromagnetic emissions produced by the wireless power transfer system operating within the interior space 124.

Figure 2A:
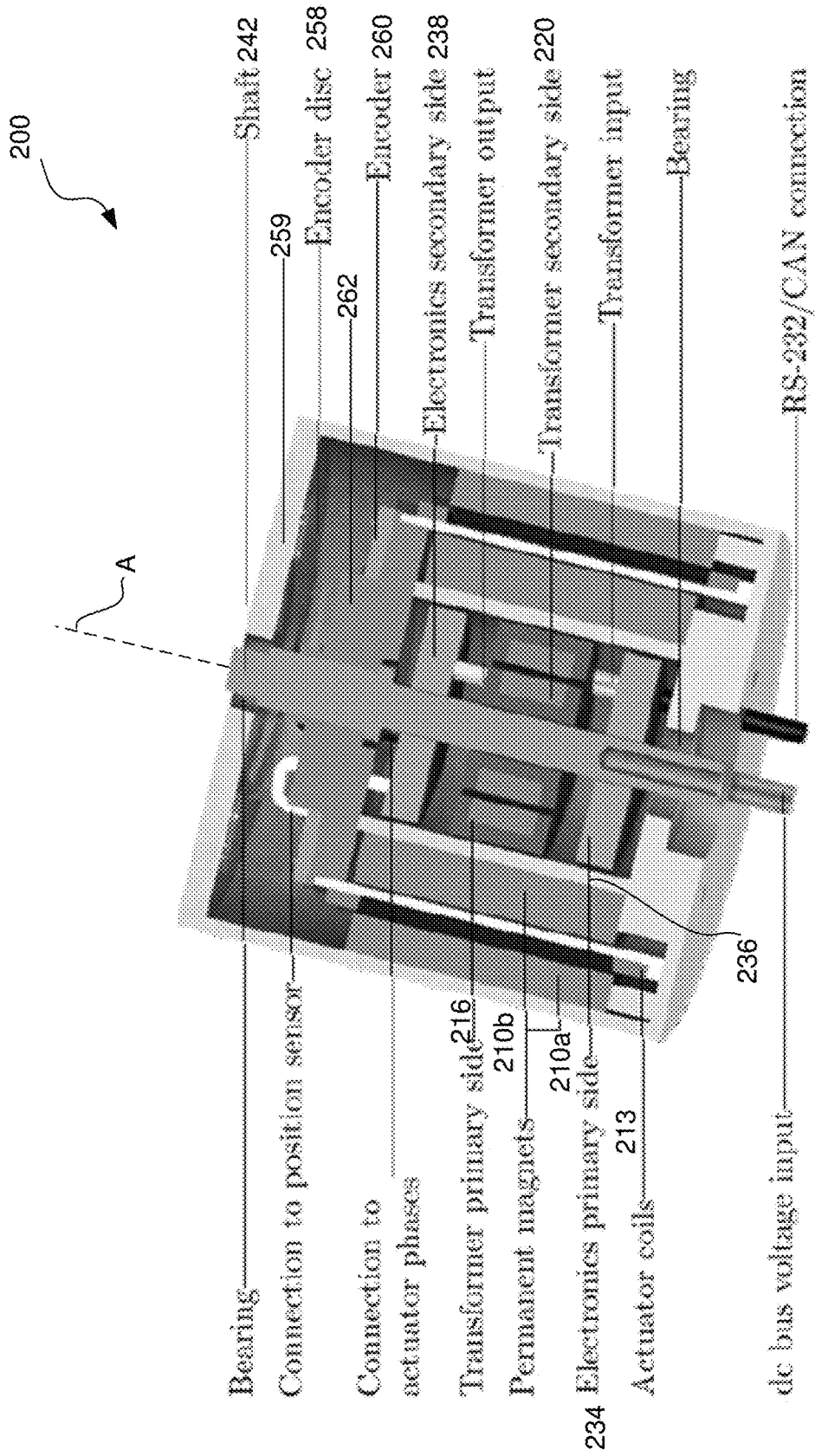
FIG. 2A illustrates a side sectional view of a moving coil brushless motor in which its rotating components are in a first rotational position about a longitudinal axis.
Figure 2B:
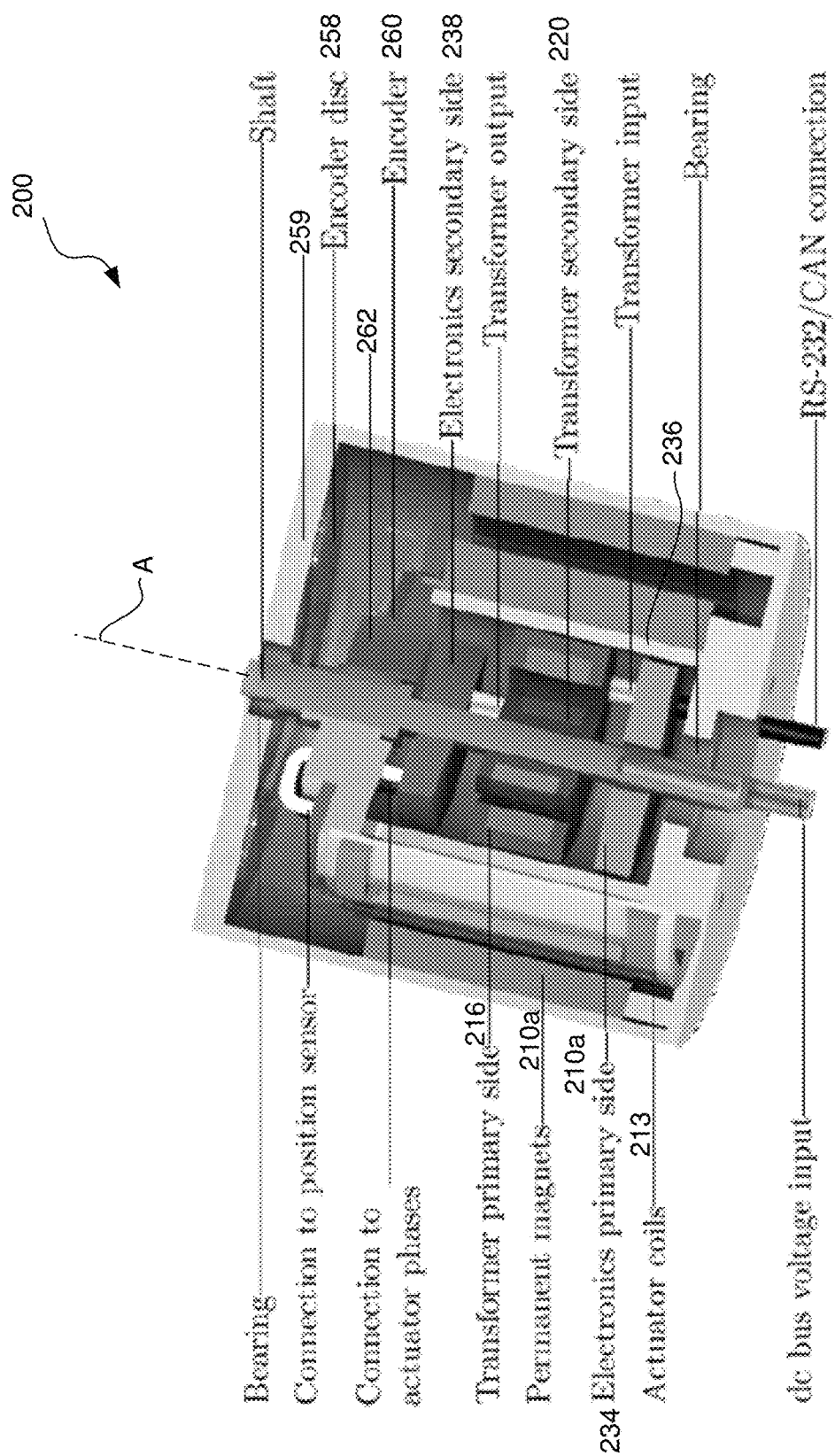
FIG. 2B illustrates a side sectional view of the moving coil brushless motor of FIG. 2A in which its rotating components are in a different angular position after having been slightly rotated about the longitudinal axis.

Reference will now be made to FIGS. 2A and 2B, which are side sectional views of an embodiment of a moving coil brushless motor 200 in accordance with the disclosure. The motor 200 includes a set of non-rotating components comprised of an outer array 210a and an inner array 210b of permanent magnets of an actuator stator, primary-side electronics 234 and a primary coil 216 of a rotary transformer. The non-rotating components further include a cylindrical aluminum back plate 436 upon which is arranged the inner array 210b of permanent magnets and an encoder disc 258 mounted to an inside surface of an actuator housing 259. A set of rotating components of the motor 200 include actuator coils 213 of an actuator rotor, secondary-side electronics 238, a secondary coil 220 of the rotary transformer, an encoder 260 mounted on an actuator rotor arm 262, and a center shaft 242 to which are coupled the secondary-side electronics 238.

During operation of the motor 200, energization of the coils 213 of the actuator rotor with current provided by the secondary-side electronics causes rotation of the actuator rotor and the shaft 242 about the axis A. FIG. 2A illustrates a side sectional view of the motor 200 in which its rotating components are in a first rotational position about a longitudinal axis A of the motor 200. In FIG. 2B, the rotating components of the motor 200 are seen to be in a different angular position after having been slightly rotated about the axis A. As shown, the transformer is comprised of a primary side having a primary coil 216 and a secondary side having a secondary coil 220. The transformer, the primary-side electronics 234, and the secondary-side electronics 238 are disposed within a hollow interior space defined by the cylindrical aluminum back plate 236.

As may be appreciated by FIGS. 2A and 2B, the transformer primary coil 216 and the transformer secondary coil 220 are separated by an air gap in an axial direction parallel to the longitudinal axis A. During operation, power is transferred from the primary coil 216 to the secondary coil 220 across the air gap by the linked magnetic field between the coils 216, 220, i.e., by inductive coupling. A high magnetic coupling may be achieved by applying a highly permeable core material (i.e. typically ferrite is applied for electrical frequencies above 10 kHz) to the transformer coils 216, 220. Additionally, resonant capacitors (not shown) may be placed in series with, or parallel to, the transformer windings 216, 220 on either or both sides, such that the leakage inductance is compensated, thus improving the transfer of power.

Figure 3:
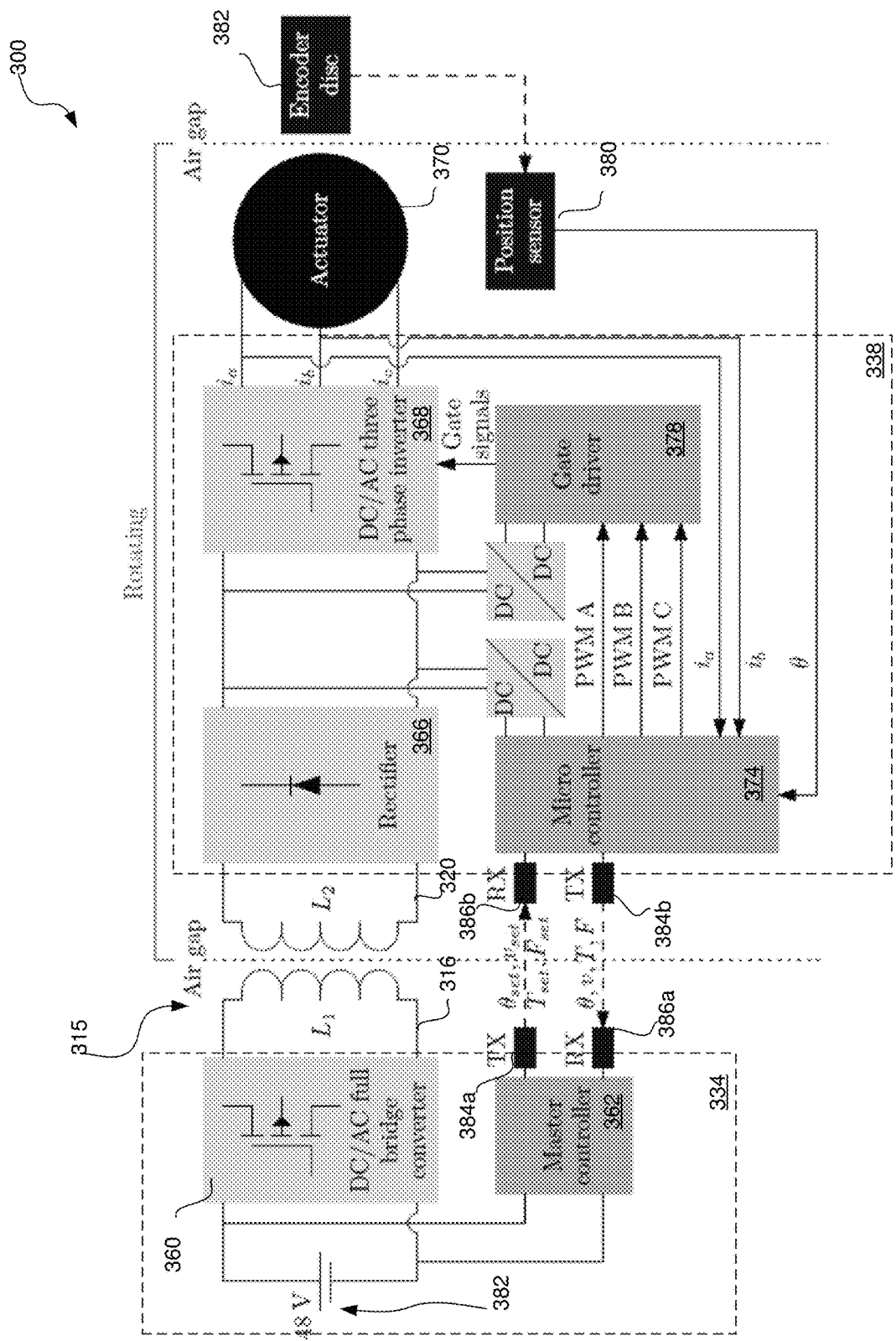
FIG. 3 illustrates an exemplary system topology of a moving coil brushless motor in accordance with the disclosure.

Referring now to FIG. 3, there is illustrated an exemplary system topology of a moving coil brushless motor 300 in accordance with the disclosure. As shown in FIG. 3, exemplary components which may be utilized to realize particular implementations of primary-side electronics 334 and secondary-side electronics 338 are illustrated. Specifically, primary-side electronics 334 may be realized using a DC/AC full bridge converter 360 connected to the primary coil 316 of the transformer 315, and a master controller 362. Secondary-side electronics 338 may include a rectifier 366 connected to the transformer secondary coil 320 and a three phase inverter 368 for providing current to rotary actuator 370, which may be realized substantially identically to the actuator 210, 213 of FIGS. 2A and 2B. The secondary electronics 338 further include a micro-controller 374 in communication with the master controller 362 and a gate driver 378. The motor 300 further includes an optical position sensor 380 and an encoder disc 382 for detecting an angular position of the shaft of actuator 370.

A dc source 382 (e.g. 48 Vdc) is used to supply the master controller 362 and the dc/ac full bridge converter 360, which is connected to the primary coil 316 of the transformer 315. Through inductive coupling, power is transferred from the primary coil 316 across the air gap to the secondary coil 320 of the transformer 315. The single-phase rectifier 366 is used to convert the received ac current to dc current, since the frequency of the received ac current is generally several orders of magnitude higher than the frequency of the actuator 370. The largest portion of the rectified power is used to supply the actuator 370, and a small part of the power is used to supply the micro-controller 374 and inverter driver 378, which both are integrated on the rotating part of the motor 300.

The set point is transferred wirelessly from the master controller 362 to the micro-controller 374. Ideally, the set point and other information communicated between the master controller 362 to the micro-controller 374 is conveyed by the transformer 315, which in one embodiment is configured for the transfer of both power and data. Alternatively, the wireless communication link between the master controller 362 and the micro-controller 374 can be based on the principle of optical data transmission through transmitters 384 and receivers 386. In other embodiments the IEEE 802.11 protocol (Wi-Fi) may be utilized for wireless data transmission, but this risks creating interference between such data transmission and the power transfer occurring through the transformer 315. The position of the rotor of the actuator 370 is obtained by the microcontroller 374 through the optical sensor 380, which in one embodiment rotates with the actuator rotor while the encoder disc 382 remains stationary.

Figures 4A, 4B:
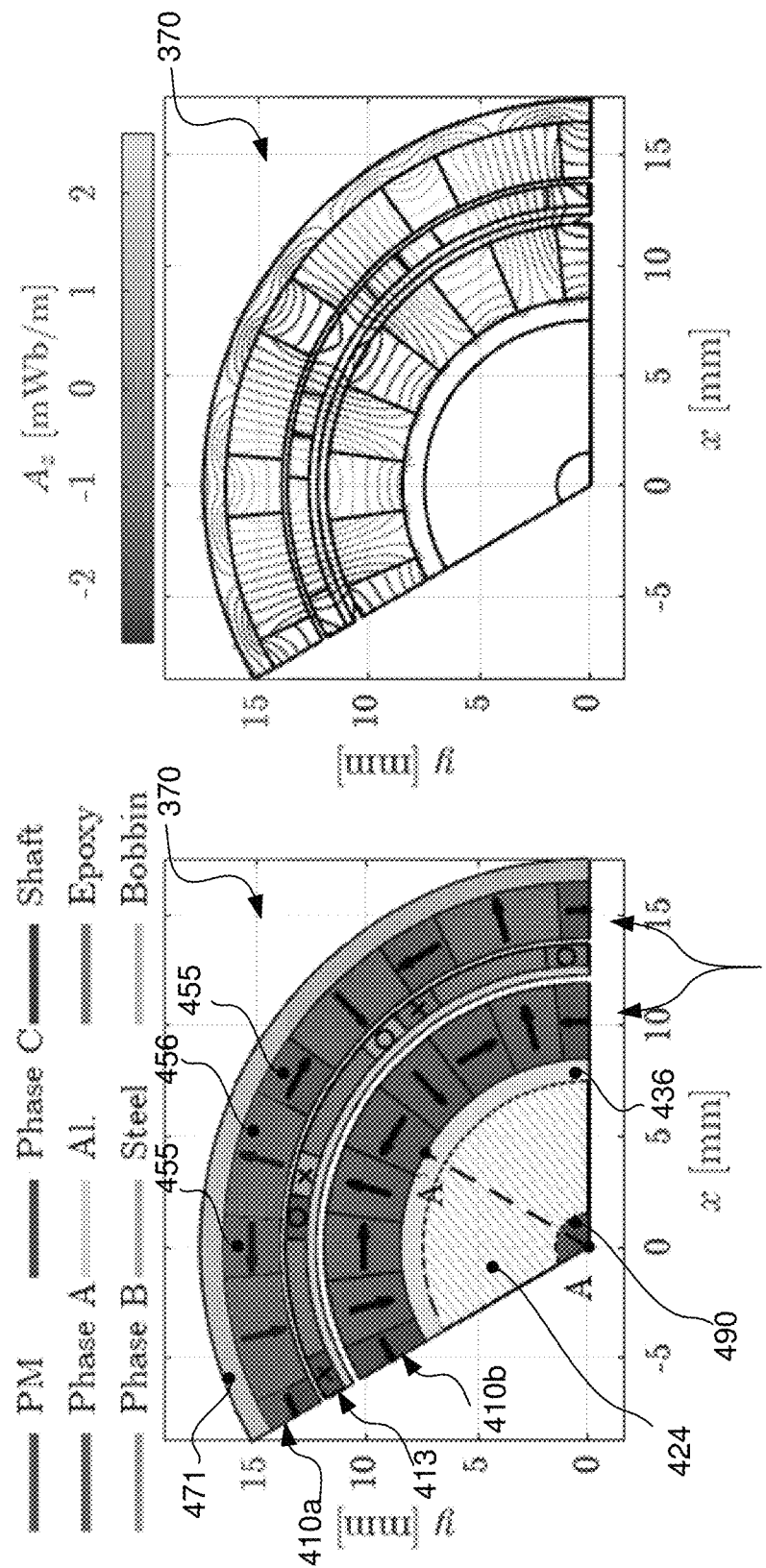
FIG. 4A is a periodical cross-section of an exemplary design of a rotary actuator included within the moving coil brushless motor of FIG. 3.
FIG. 4B is a contour plot of the magnetic vector potential in the actuator of FIG. 4A which illustrates the self-shielding effect of its inner permanent magnet array.

Attention is now directed to FIG. 4A, which is a periodical cross-section of an exemplary design of the rotary actuator 370. As shown, FIG. 4A indicates the various materials and components that may be utilized to implement the rotary actuator 370 as well as the magnetization direction of the magnet components and the polarity of the rotor coils. The actuator 370 surrounds a hollow interior space 424 defined by aluminum back plate 436, within which is integrated the wireless power transfer system based upon transformer 315. In one embodiment the actuator 370 includes an external stator double-sided permanent magnet array 437 and an internal rotor coil assembly 413. The stator double-sided permanent magnet array 437 includes an outer array 410a and an inner array 410b. The permanent magnets of the outer array 410a and the inner array 410b are arranged in a quasi-Halbach configuration, in which circumferentially magnetized permanent magnets 455 are added in between the radially magnetized permanent magnets 456.

In other embodiments the actuator 370 may include a stator comprised of a double-sided permanent magnet array and an internal rotor coil assembly where only the permanent magnets of the inner array are arranged in a quasi-Halbach configuration. In this case the outer array of permanent magnets could, for example, include only radially magnetized permanent magnets. The actuator could also be implemented by omitting the outer array of permanent magnets entirely, in which case the actuator could include a cylindrical steel back plate circumscribing the rotor coil assembly.

FIG. 4B is a contour plot of the magnetic vector potential in the actuator 370 which illustrates the self-shielding effect of the inner permanent magnet array 410b. Specifically, in one embodiment the pole-arc to pole-pitch ratio of the inner permanent magnet array 410b is optimized for maximized self-shielding, such that the magnetic field below the permanent magnet array 410b is minimized. Consequently, the magnetic field originating from the permanent magnet array 437 is diverted from the hollow center 424 of the actuator 370. Furthermore, aluminum may be used in the inner backplate 436 for the array 437, such that the actuator 370 is shielded from the high-frequency wireless power transfer system based upon transformer 315. In the case of the outer permanent magnet array 410a, the pole-arc to pole-pitch ratio is optimized for maximized torque production. Additionally, carbon steel may be used in the outer back-plate 471 to further benefit the torque producing capabilities.

Figures 5A, 5B:
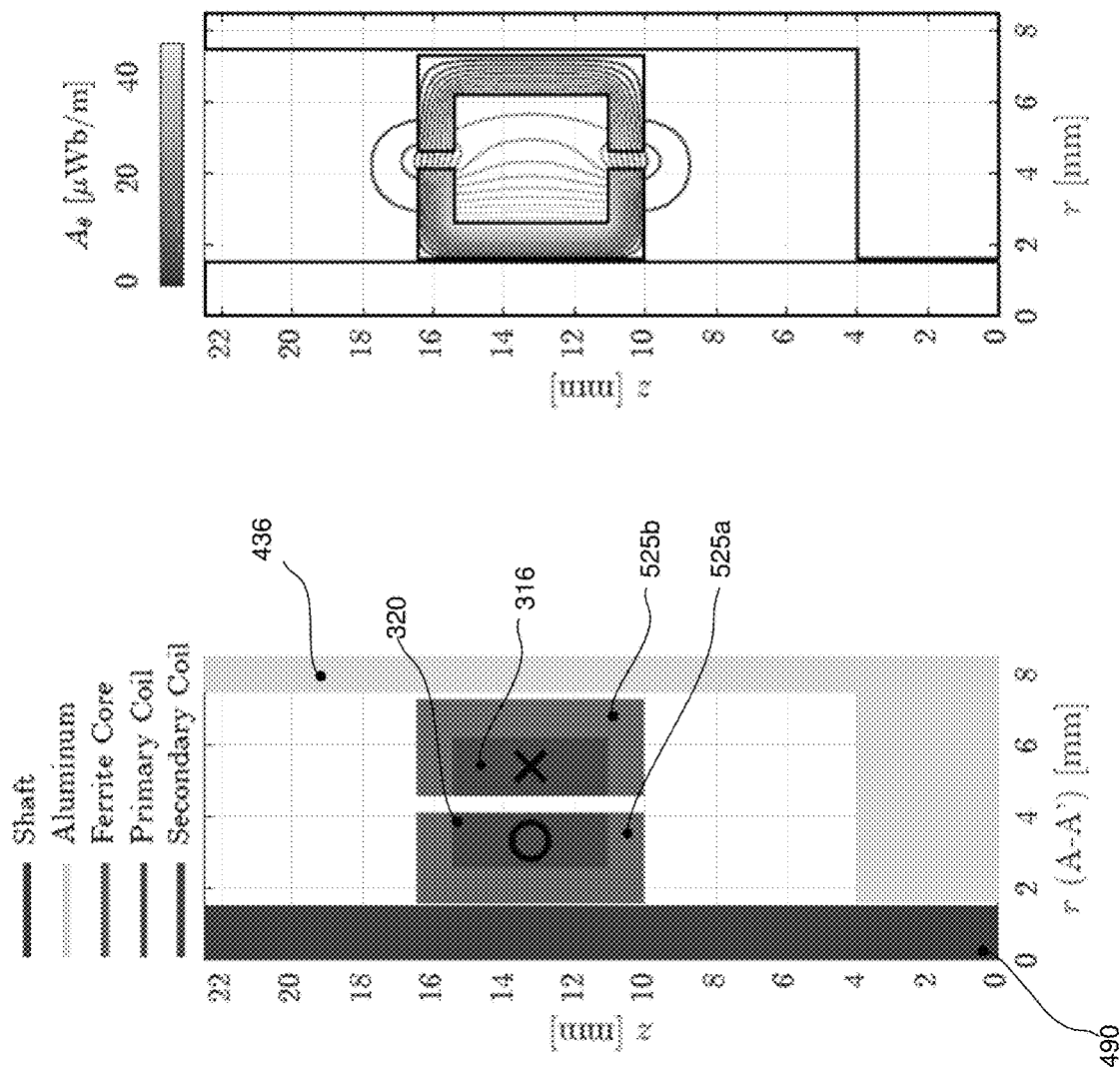
FIG. 5A is a sectional view is provided of the topology of an exemplary implementation of a cylindrical transformer of the brushless motor of FIG. 3 in an axisymmetrical plane.
FIG. 5B is a contour plot of the magnetic vector potential originating from the transformer of FIG. 5A.

Turning now to FIG. 5A, a sectional view is provided of the topology of an exemplary implementation of the cylindrical transformer 315. The sectional view of FIG. 5A illustrates the topology of the cylindrical transformer 315 in an axisymmetrical plane (i.e. section A-A' indicated in FIG. 4A). Again, the cylindrical transformer 315 forms part of a wireless power transfer system that is preferably disposed within the hollow center 424 of the actuator 370. The cylindrical transformer 315 functions to transfer power across a small air gap through inductive coupling. In one embodiment the primary coil 316 and the secondary coil 320 of the transformer 315 are placed in separate ferrite core parts 525.

As is indicated by FIG. 5A, the secondary side of the transformer 315, which comprises the secondary coil 320, is mounted to the shaft 490. The primary side of the transformer 315, which comprises the primary coil 316, is mounted to the aluminum back-plate 436. The power is transferred across the air gap in the radial direction. The transformer 315 employs an electrical frequency approaching 1 MHz, such that the volume of the transformer 315 is minimized. Additionally, on both the primary and secondary side of the transformer 315, resonant capacitors are preferably placed in series with the coils 316 and 320. This compensates for leakage inductances, thus improving power transfer.

FIG. 5B is a contour plot of the magnetic vector potential originating from the transformer 315. As a result of the air gap configuration and large axial height of the hollow center, the eddy current losses induced by the transformer 315 are minimized since there are no conductive materials present in the direct vicinity of the air gap. This results in the magnetic vector potential originating from the transformer 315 being confined to the immediate vicinity of the transformer 315, as is demonstrated in FIG. 5B. Since FIG. 4B demonstrates that the magnetic vector potential due to the actuator 370 is minimized below the permanent magnet array 410b (i.e., does not substantially extend into the hollow interior space 424), it is apparent from FIGS. 4B and 5B that the actuator 370 and the wireless power transfer system based upon the transformer 315 are magnetically decoupled.

The moving coil brushless motor disclosed herein advantageously eliminates the need to use a moving cable or brushes/slip rings to energize a moving coil actuator by integrating a wireless power transfer system. In order to provide a viable alternative to a moving cable and brushes/slip rings, it will generally be preferable to minimize the inertia added by the wireless power transfer system. Consequently, high electrical frequencies and thus GaN transistors are desirable, such that the transformer volume and power density are optimized. However, the integration of a high-frequency wireless power transfer system with a moving coil actuator imposes several challenges. First, significant eddy current losses can be induced by the wireless power transfer system in conductive materials present in the actuator environment (e.g. permanent magnets, aluminum, or steel). Second, the strong magnetic field originating from the permanent magnets of the stator can lead to magnetic saturation of the transformer core. Third, electronics have to be integrated on the rotating side of the system. Consequently, a reliable communication link between the stationary and rotating side of the system needs to be established. Finally, since additional heat sources are added to the system, heat generation and dissipation parameters have to be carefully examined. The moving coil brushless motor disclosed herein successfully addresses these challenges.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited to their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A moving coil brushless motor, comprising:
   an actuator including:
      a stator having an outer array of permanent magnets arranged in a first cylindrical configuration and an inner array of permanent magnets arranged in a second cylindrical configuration on an inner back plate;
      a rotor including:
         a coil assembly including a plurality of coils interposed between the outer array of permanent magnets and the inner array of permanent magnets wherein the coil assembly is disposed to rotate relative to the outer array of permanent magnets and the inner array of permanent magnets;
      a center shaft disposed to rotate about a longitudinal axis;
      a cylindrical transformer disposed within an interior space circumscribed by the inner back plate, the cylindrical transformer including a primary side and a secondary side wherein the primary side includes a primary coil and the secondary side includes a secondary coil, the primary coil being magnetically coupled to the secondary coil;
   primary electronics disposed within the interior space; and
   secondary electronics disposed within the interior space wherein the primary electronics are in communication with the secondary electronics and wherein the secondary electronics are attached to the center shaft, the secondary electronics being configured to receive power from the secondary coil and to provide current to the actuator, wherein the secondary electronics include power conditioning electronics having a rectifier connected to the secondary coil and a phase inverter connected between an output of the rectifier and the coil assembly.

2. The moving coil brushless motor of claim 1 wherein the inner array of permanent magnets includes a first plurality of circumferentially magnetized permanent magnets and a first plurality of radially magnetized permanent magnets and wherein ones of the circumferentially magnetized permanent magnets are interposed between pairs of the radially magnetized permanent magnets.

3. The moving coil brushless motor of claim 2 wherein the outer array of permanent magnets includes a second plurality of circumferentially magnetized permanent magnets and a second plurality of radially magnetized permanent magnets.

4. The moving coil brushless motor of claim 1 wherein the secondary electronics further include a micro-controller disposed to receive a portion of a rectified current produced by the rectifier.

5. The moving coil brushless motor of claim 1 wherein the primary electronics are attached to the inner back plate.

6. The moving coil brushless motor of claim 1 wherein the primary electronics include a master controller and the secondary electronics include a micro-controller and wherein the master controller communicates with the micro-controller through one of the transformer or an optical link.

7. The moving coil brushless motor of claim 6 wherein the primary electronics further include a DC power source and a full bridge rectifier wherein the full bridge rectifier is connected between the DC power source and the primary coil.

8. The moving coil brushless motor of claim 1 wherein the outer array of permanent magnets is arranged on an outer back plate such that the outer array of permanent magnets is between the outer back plate and the coil assembly.

9. The moving coil brushless motor of claim 1 wherein the primary side is mounted to the inner hack plate and the secondary side is mounted to the center shaft.

10. The moving coil brushless motor of claim 1 wherein the primary coil and the secondary coil bound a radial gap extending parallel to the longitudinal axis.

11. The moving coil brushless motor of claim 1 wherein the primary side includes a primary coil placed in a first core and the secondary side includes a secondary coil placed in a second core.

12. A moving coil brushless motor, comprising:
an actuator including:
  a stator having an outer array of permanent magnets arranged in a first cylindrical configuration and an inner array of permanent magnets arranged in a second cylindrical configuration on an inner back plate;
a rotor including:
  a coil assembly including a plurality of coils interposed between the outer array of permanent magnets and the inner array of permanent magnets wherein the coil assembly is disposed to rotate relative to the outer array of permanent magnets and the inner array of permanent magnets;
a center shaft disposed to rotate about a longitudinal axis;
a cylindrical transformer disposed within an interior space circumscribed by the inner back plate, the cylindrical transformer including a primary side and a secondary side wherein the primary side includes a primary coil and the secondary side includes a secondary coil, the primary coil being magnetically coupled to the secondary coil;
primary electronics disposed within the interior space, and
secondary electronics disposed within the interior space wherein the primary electronics are in communication with the secondary electronics and wherein the secondary electronics are attached to the center shaft, the secondary electronics being configured to receive power from the secondary coil and to provide current to the actuator;
  wherein the inner back plate is comprised of aluminum such that the actuator is substantially shielded from high-frequency electromagnetic energy produced by the cylindrical transformer.

13. A moving coil brushless motor, comprising:
an actuator including:
  a stator having an outer array of permanent magnets arranged in a first cylindrical configuration and an inner array of permanent magnets arranged in a second cylindrical configuration on an inner back plate:
a rotor including:
  a coil assembly including a plurality of coils interposed between the outer array of permanent magnets and the inner array of permanent magnets wherein the coil assembly is disposed to rotate relative to the outer array of permanent magnets and the inner array of permanent magnets;
a center shaft disposed to rotate about a longitudinal axis;
a cylindrical transformer disposed within an interior space circumscribed by the inner back plate, the cylindrical transformer including a primary side and a secondary side wherein the primary side includes a primary coil and the secondary side includes a secondary coil, the primary coil being magnetically coupled to the secondary coil;
primary electronics disposed within the interior space and
secondary electronics disposed within the interior space wherein the primary electronics are in communication with the secondary electronics and wherein the secondary electronics are attached to the center shaft, the secondary electronics being configured to receive power from the secondary coil and to provide current to the actuator;
  wherein the outer array of permanent magnets is arranged on an outer back plate such that the outer array of permanent magnets is between the outer back plate and the coil assembly, and
  wherein the inner back plate is comprised of aluminum and the outer back plate is comprised of carbon steel.

* * * * *